United States Patent
Kim et al.

(10) Patent No.: US 8,693,581 B2
(45) Date of Patent: Apr. 8, 2014

(54) SIGNAL RECEIVER WITH DIGITAL FRONT END SUPPORTING MULTIPLE BAND AND SIGNAL RECEIVING METHOD USING THE SAME

(75) Inventors: Sang-Kyun Kim, Mungyeong-si (KR); Ik Soo Eo, Daejeon (KR); Mijeong Park, Gongju-si (KR); Hyun Kyu Yu, Daejeon (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 241 days.

(21) Appl. No.: 13/284,751

(22) Filed: Oct. 28, 2011

(65) Prior Publication Data

US 2012/0163517 A1   Jun. 28, 2012

(30) Foreign Application Priority Data

Dec. 23, 2010  (KR) .................. 10-2010-0134104

(51) Int. Cl.
*H03K 9/00*   (2006.01)
*H04L 27/00*  (2006.01)

(52) U.S. Cl.
USPC .......................................... 375/316; 375/350

(58) Field of Classification Search
USPC .................. 375/259–260, 285, 316, 346, 350
See application file for complete search history.

(56) References Cited

U.S. PATENT DOCUMENTS

| | | | |
|---|---|---|---|
| 2010/0056201 A1* | 3/2010 | Akamine et al. | 455/552.1 |
| 2010/0091688 A1* | 4/2010 | Staszewski et al. | 370/277 |
| 2010/0098190 A1 | 4/2010 | Kim | |
| 2010/0104055 A1 | 4/2010 | Jeong et al. | |
| 2010/0166124 A1* | 7/2010 | Behrens et al. | 375/344 |

OTHER PUBLICATIONS

Gernot Hueber et al., "Smart Front-End Signal Processing for Advanced Wireless Receivers", IEEE Journal of Selected Topics in Signal Processing, Jun. 2009, 472-487, vol. 3, No. 3, IEEE.

* cited by examiner

*Primary Examiner* — Jean B Corrielus

(57) ABSTRACT

Disclosed is a method for receiving an analog signal from a receiver supporting at least a first channel band and a second channel band. The method for receiving an analog signal includes sampling the analog signal received through an antenna, generating a decimated signal by passing the sampled signal to a CIC decimation filter; and inputting the decimated signal to a channel selection filter.

9 Claims, 6 Drawing Sheets

SIGNAL RECEIVER WITH DIGITAL FRONT END SUPPORTING MULTIPLE BAND AND SIGNAL RECEIVING METHOD USING THE SAME

CROSS-REFERENCES TO RELATED APPLICATIONS

The present application claims priority under 35 U.S.C 119(a) to Korean Application No. 10-2010-0134104, filed on Dec. 23, 2010, in the Korean Intellectual Property Office, which is incorporated herein by reference in its entirety set forth in full.

BACKGROUND

Exemplary embodiments of the present invention relate to a digital receiver of a mobile communication system of supporting multiple channels and multiple bands.

Generally, a digital front end serves to perform digital modulation and demodulation of an RF receiver performing signal processing of a radio frequency/intermediate frequency (RF/IF) end using digital or discrete time rather than performing the signal processing thereof using an analog circuit of the related art.

Most of the mobile communication system standards support multiple channel bands and various frequency bands are supported. As an example, a long term evolution (LTE) system standard supports various frequency bands, such as 1.4 MHz, 3 MHz, 5 MHz, 10 MHz, 15 MHz, 20 MHz, or the like.

In the related art, when a single system supports multiple channel bands, a frequency band is narrow so as to all the channel bands in single hardware architecture and thus, the number of taps required in a channel filter is increased in inverse proportion thereto. In order to implement the channel filter, a multiplier that is the most complex arithmetic unit in a digital hardware is required. However, the number of taps is increased and the number of multipliers is also increased accordingly, such that complexity in implementing digital hardware may be increased.

In order to solve the problems, methods for preventing the number of multipliers from suddenly increasing by using a multi-stage channel filter have been used. However, since most of the methods are implemented by a finite impulse response filter, the methods also have a problem in that the required number of multipliers is increased according to a channel bands.

The above technology configuration is a background art for helping understanding of the present invention but does not mean the related art well-known in the art to which the present invention pertains.

SUMMARY

An object of the present invention is to implement a digital front end (DFE) capable of performing digital demodulation of an RF receiver based on a digital RF technology performing signal processing of an RF/IF end using digital rather than performing the signal processing thereof using an analog circuit of the related art.

In particular, exemplary embodiments of the present invention can effectively process signals according to channel bands without suddenly increasing complexity in a system of supporting various channel bands.

The scope of the present invention is not limited to the above-mentioned objects.

An embodiment of the present invention relates to a method for receiving a signal with a signal receiver with a digital front end supporting multiple bands, including: sampling signals received through an antenna of the receiver supporting at least a first channel band and a second channel band; generating decimated signals by passing the sampled signal to a cascaded integrator comb (CIC) decimation filter; inputting the decimated signal to a channel selection filter.

A first ratio of the first channel band to a first sampling rate included in a signal output by passing a first signal having the first channel band among the signals to the CIC decimation filter may be equal to a second ratio of the second channel band to a second sampling rate included in a signal output by passing a second signal having the second channel band among the analog signals to the CIC decimation filter.

The sampling rate at the sampling may be constant regardless of the channel bands of the analog signals.

The inputting to the channel selection filter may include resampling the decimated signal.

The step of resampling makes the sampling rate outputted constant regardless of the first channel band and the second channel band.

An embodiment of the present invention relates to a signal receiver with a digital front end supporting multiple bands, including: an analog-to-digital converter (ADC) sampling an analog signal received from an antenna with a digital signal; a CIC decimation filter decimating an output signal from the ADC; and a channel selection filter receiving a signal output from the CIC decimation filter, wherein the CIC decimation filter has a configuration in which a plurality of the same CIC filters are connected in series and supports at least a first channel band and a second channel band.

A first ratio of the first channel band to a first sampling rate included in a signal output by passing a first signal having the first channel band among the analog signals to the CIC decimation filter may be equal to a second ratio of the second channel band to a second sampling rate included in a signal output by passing a second signal having the second channel band among the analog signals to the CIC decimation filter.

The sampling rate of the ADC may be constant regardless of the channel bands of the analog signals.

A resampler making the sampling rate output regardless of the first channel band and the second channel band constant may be further provided between the CIC decimation filter and the channel selection filter.

A CIC compensation filter may be further provided between the CIC decimation filter and the resampler and a frequency response of the CIC compensation filter at the first channel band and the second channel band has an inverse relationship with a frequency response of the CIC decimation filter at the first channel band and the second channel band.

As set forth above, the exemplary embodiments of the present invention can effectively support the system of supporting various channel bands and frequency bands by variably controlling the integer or real decimation rate according to the channel bands or frequency bands of the signal in the digital front end.

In addition, the exemplary embodiments of the present invention can reduce the power consumption while reducing the complexity of hardware configuration by minimizing the number of multipliers.

The scope of the present invention is not limited to the above-mentioned effects.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Figure 1:
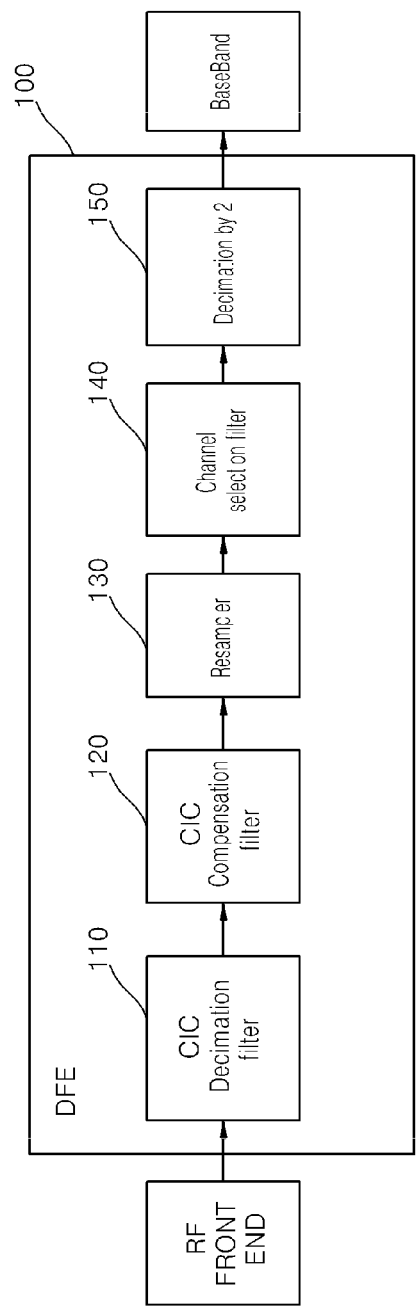
FIG. 1 is a diagram showing a schematic structure of a digital front end according to an exemplary embodiment of the present invention.

Hereinafter, embodiments of the present invention will be described with reference to accompanying drawings. However, the embodiments are for illustrative purposes only and are not intended to limit the scope of the invention.

In describing the embodiment, a thickness of lines illustrated in the drawings, a size of components, etc., may be exaggeratedly illustrated for clearness and convenience of explanation. In addition, terms described to be below are terms defined in consideration of functions in the present invention, which may be changed according to the intention or practice of a user or an operator. Therefore, these terms will be defined based on contents throughout the specification.

Exemplary embodiments of the present invention will describe an operation structure of a digital receiver supporting multiple channel bands in a radio communication system. A case of using 6 frequency bands (1 MHz, 4 MHz, 3 MHz, 5 MHz, 10 MHz, 15 MHz, and 20 MHz) supported in an LTE system standard as an input will be described below, but a case of using other frequency bands may also be applied.

FIG. 1 is a diagram for explaining a schematic structure of a digital front end according to an exemplary embodiment of the present invention.

An RF input signal is input to a digital front end via a low noise amplifier (LNA) and an analog to digital converter (ADC). In the exemplary embodiments of the present invention, the digital front end serves to convert a signal, which is converted into digital, into a sampling rate required in a standard of a system through a decimation and filtering process.

Referring to FIG. 1, a digital front end (DFE) 100 according to the exemplary embodiment of the present invention includes a CIC decimation filter 110, a CIC compensation filter 120, a resampler 130, and a channel selection filter 140.

The CIC decimation filter 110 serves to lower sampling rates of received signals so as to prevent the received signals from being processed with large oversampling rate in the remaining blocks of a DFE block.

The exemplary embodiment of the present invention may design the CIC decimation filter at multi-stage in the case of a system of supporting multiple bands so as to constantly maintain a ratio of a sampling rate to a channel band. By the configuration, the exemplary embodiment of the present invention can effectively filter even a signal having a narrow band without increasing the number of multipliers in a channel selection filter.

The CIC compensation filter 120 serves to compensate in-band error that occurs in the CIC decimation filter 110.

One of characteristics included in the digital RF receiver is changed depending on a frequency of a local oscillator (LO) signal rather than depending on the sampling rates of the received signals.

Although data rates of the received signals are the same, the sampling rates of the sampled received signals may be changed when an LO signal frequency of a communication channel is different.

Therefore, the sampling rates of the received signals that are made through the signal processing needs to be constant. This is made through the resampler 130 block. The multiple bands may be supported by the operation of the resampler block.

The channel selection filter 140, which is a filter performing very sudden filtering at an edge of a channel frequency band, serves to remove signal out-of-band noise. Further, the ratios of sampling rates to bands are not changed according to the channels through the resampler 130 block and thus, the channel selection filter 140 positioned at the latter part may be more effectively implemented.

Figure 2:
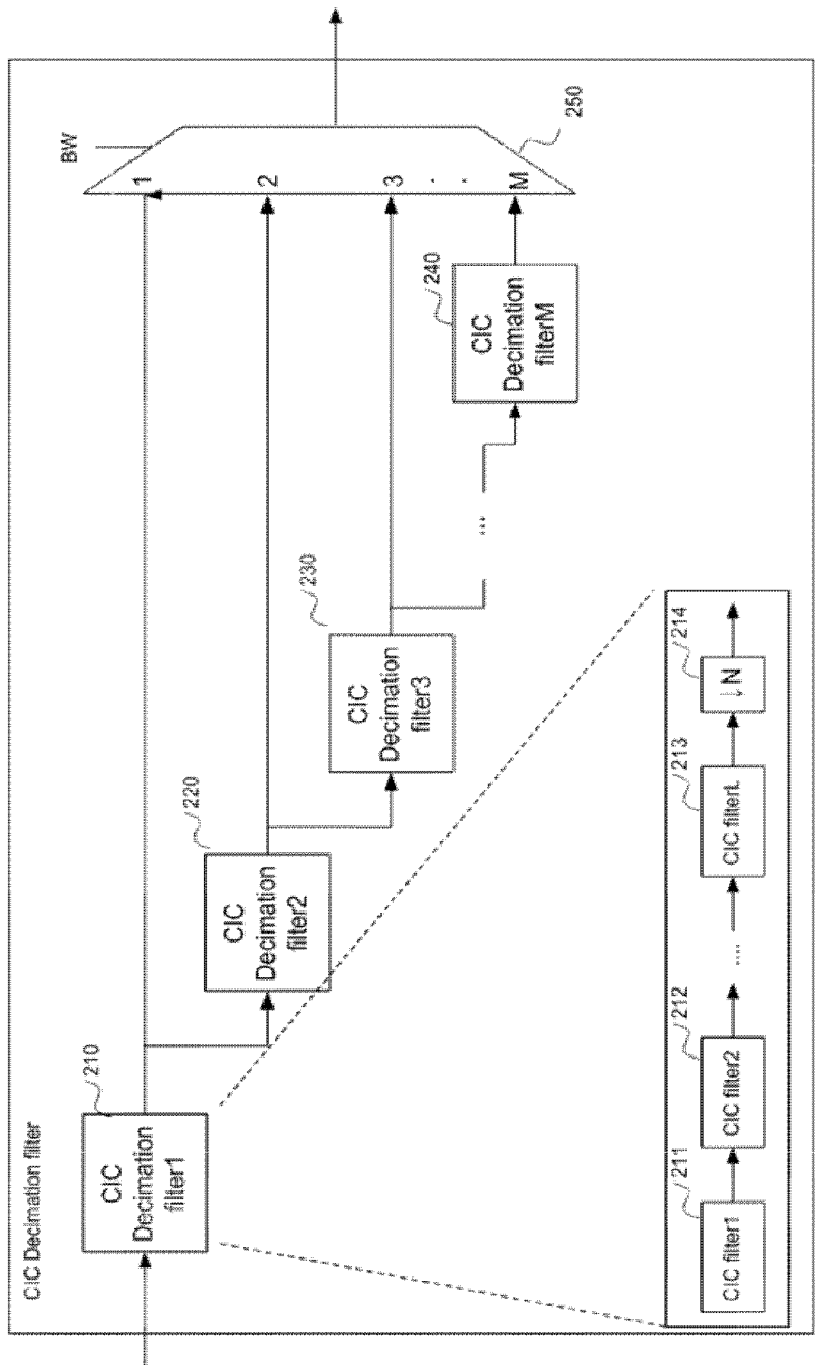
FIG. 2 is a diagram showing a structure of a CIC decimation filter in a digital front end according to the exemplary embodiment of the present invention.

FIG. 2 is a diagram for explaining the CIC decimation filter 110 in the DFE according to the exemplary embodiment of the present invention.

The CIC decimation filter 110 serves to receive an ADC output signal and filter and decimate the received ADC output signal. Since the sampled signal of the ADC is the fastest signal among signals in the DFE 100 block, a structure of the decimation filter 110 is also simple. Therefore, in the exemplary embodiment of the present invention, the decimation filter is implemented using a CIC filter without a multiplier instead of a general digital low pass filter that needs a multiplier.

$$y_k = \frac{1}{N} \sum_{j=k-(N-1)}^{k} x_j \qquad \text{[Equation 1]}$$

It can be appreciated from Equation 1 that a filter coefficient multiplied by input x is 1. Therefore, since the multiplier is not needed in implementing the CIC filter, complexity in implementing hardware can be reduced.

The number of non-zero impulses is an order of the CIC filter. Generally, the CIC filter needs to be an integer multiple of N so as to perform down sampling by N. As described above, only when the order of the CIC filter is an integer multiple of the down sampling, an aliasing problem occurring by an interference signal existing at adjacent channels during the down sampling process may be solved. However, a large interference signal above several tens of dB may not be filtered by only a single CIC filter. As a result, a multiple filtering effect may be obtained by connecting the same CIC filters 211, 212, and 213 in series, such that an overlapping problem of the signal generated by the down sampling process and the interference signal may be solved.

Further, even when a single system supports the multiple channel bands, the CIC filter may effectively change the channel filter according to the channel band without greatly increasing the complexity. When a signal having a narrow frequency band has a constant ADC output sampling rate, the number of taps of the channel selection filter for the signal having a narrow frequency signal is suddenly increased and the multipliers are needed accordingly, if the signal having a narrow frequency band passes through the CIC decimation filter using all the same sampling rates in each channel band. The multiplier is one of arithmetic units having large complexity. As a result, when the number of multipliers is increased, the complexity in implementing hardware is increased. Accordingly, in order to prevent the number of multipliers from increasing in the exemplary embodiment of the present invention, the CIC decimation filters 210, 220, 230, and 240 are implemented by multi-stage, such that the number of taps of the channel selection filter is not increased and the CIC filter does not use the multiplier, such that the CIC filter may effectively filter even the signal having a narrow frequency band without greatly increasing the complexity.

Figure 3:
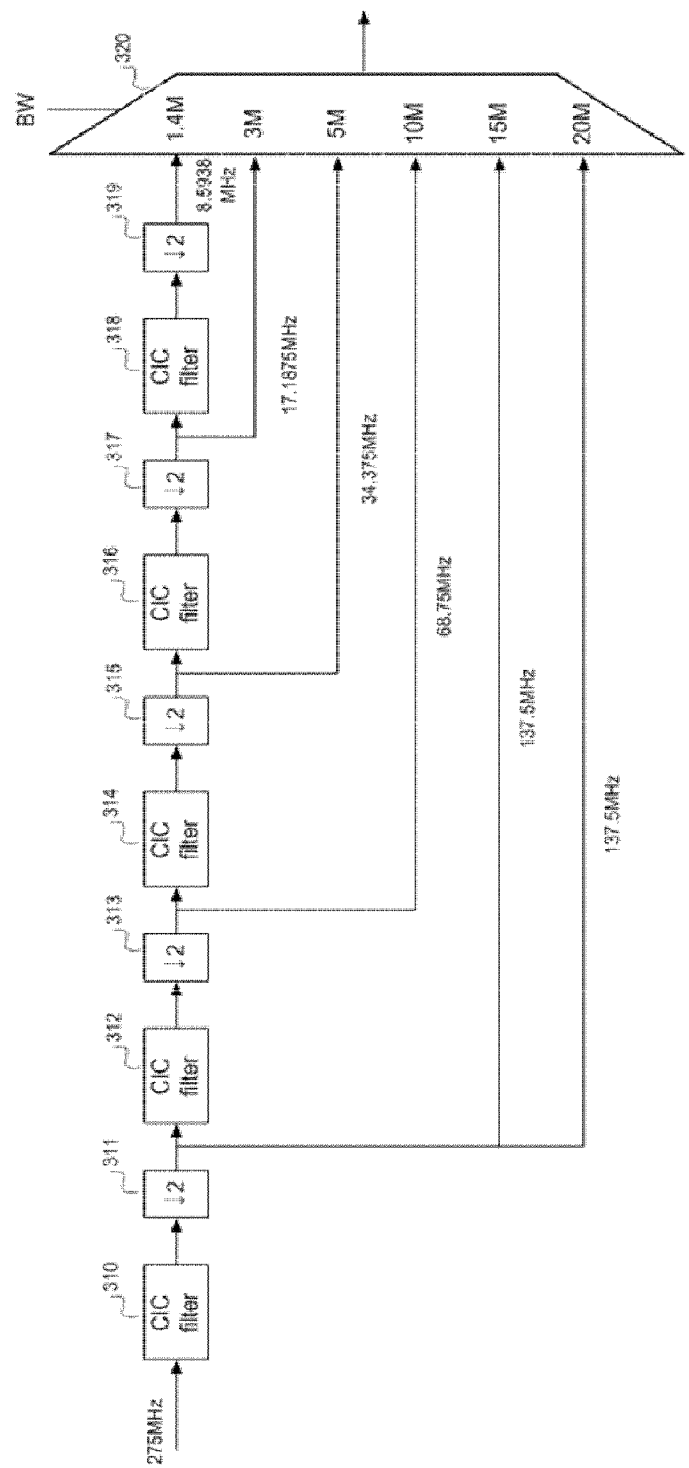
FIG. 3 is a diagram showing a structure of a multi-stage CIC decimation filter supporting multiple bands based on an LTE system.

FIG. 3 is a diagram for explaining the CIC decimation filter 110 in the DFE according to the exemplary embodiment of the present invention.

FIG. 3 shows the multi-stage CIC decimation filter supporting the multiple bands defined in the LTE system.

Table 1 shows a modem input sampling rate according to the input signal band in the LTE system. It can be appreciated that the ratios of the sampling rates to the bands are the same in all the bands. Therefore, the CIC decimation filter performs the multi-stage decimation according to bands to control the output sampling rate of the signal, such that the number of resampler 130 blocks of the latter end may be equal to the number of taps of the channel selection filter.

TABLE 1

| Band(MHz) | Sampling Rate Required in Standard(MHz) |
| --- | --- |
| 20 | 30.72 |
| 15 | 23.04 |
| 10 | 15.36 |
| 5 | 7.68 |
| 3 | 3.84 |
| 1.4 | 1.92 |

Referring to FIG. 3, the sampling rate of the signal is controlled while the multi-stage CIC decimation filter 110 is operated according to the frequency band of the input signal.

For example, when the ADC output sampling rate is 275 MHz and a band is 20 MHz, only a first CIC filter 310 and a down sampling block by 2 311 are operated to generate an output sampling rate of 137.5 MHz.

When the band of the input signal is 10 MHz, the first CIC filter 310, a second CIC filter 312, and two down sampling blocks by 2 311 and 313 are operated to generate an output sampling rate of 68.75 MHz. Even when the bands of the input signals are 5 MHz, 3 MHz, and 1.4 MHz, the CIC filters and the down sampling blocks by 2 each corresponding to the bands are operated like the above-mentioned process to generate output sampling rates of 34.375 MHz, 17.1875 MHz, 8.5938 MHz, respectively.

Table 2 shows the output sampling rates of the signal passing through the multi-stage CIC decimation filter 110 according to the exemplary embodiment of the present invention depending on the frequency bands.

TABLE 2

| Band of Input Signal(MHz) | CIC Output Sampling Rate (MHz) | Sampling Rate Required in Standard(MHz) | CIC Output Sampling Rate/Sampling Rate Required in Standard |
| --- | --- | --- | --- |
| 20 | 137.5 | 30.72 | 4.476 |
| 15 | 137.5 | 23.04 | 5.968 |
| 10 | 68.75 | 15.36 | 4.476 |
| 5 | 34.375 | 7.68 | 4.476 |
| 3 | 17.1875 | 3.84 | 4.476 |
| 1.4 | 8.5938 | 1.92 | 4.476 |

As can be appreciated from Table 2, the decimation rates to be processed after the CIC decimation filter 110 are the same in all the bands other than 15 MHz. Accordingly, the problem in that the number of multipliers is additionally increased according to the band in the resampler 130 and the channel selection filter 140 is solved by using the multi-stage CIC decimation filter 110. The number of CIC filters may be increased according to the bands, but the CIC filter has a structure that does not include the multiplier, such that the complexity of the hardware configuration is not greatly increased.

Figure 4:
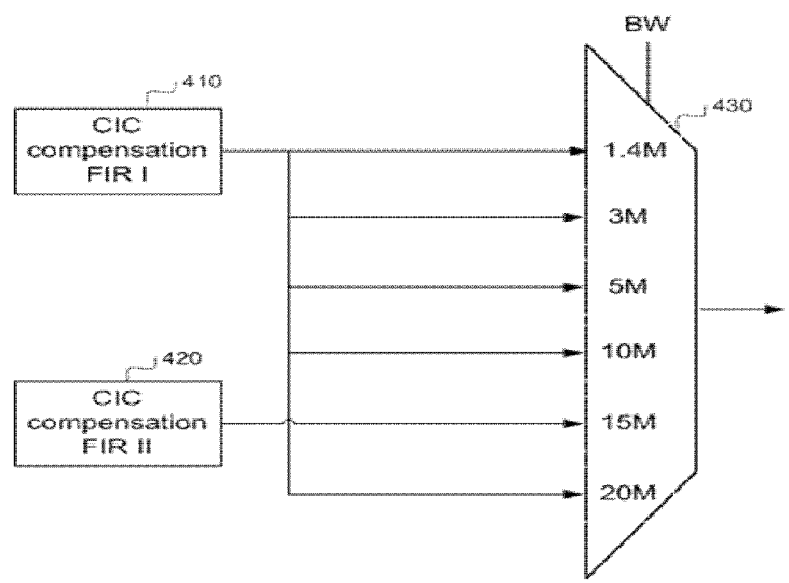
FIG. 4 is a diagram for explaining a structure of a CIC compensation filter according to the exemplary embodiment of the present invention.

FIG. 4 is a diagram for explaining an operation of the CIC compensation filter 120 according to the exemplary embodiment of the present invention.

The CIC compensation filter 120 is a block compensating distortions occurring in the CIC decimation filter 110. The CIC filter does not include a flat pass band, thereby causing a phenomenon that an in-band signal is distorted. An FIR filter that is a reciprocal number of the CIC filter provided so as to compensate the distortion may be referred to the CIC compensation filter 120. The CIC compensation filter 120 uses the FIR filter having the multiplier, but is operated at the sampling rate lower than that of the CIC decimation filter 110, such that the hardware configuration of the CIC compensation filter 120 may be more efficiently implemented. In addition, the CIC compensation filter 120 has a filtering function for adjacent channels and therefore, may also include a function of preventing the aliasing occurring when the down sampling is performed in the resampler 130 of the latter end.

CIC compensation filters 410 and 420 described in FIG. 4 are operated as values of different filter coefficients according to the input bands. However, according to Table 2, when the multi-stage CIC filter according to the frequency band is used in the LTE system, the ratios of [CIC output sampling rate/sampling rate required in standard] are the same except for the case of 15 MHz, such that the same CIC compensation filter 410 may be used for the above-mentioned five frequency bands. When the ratios of [CIC output sampling rate/sampling rate required in standard] even for the system supporting various bands rather than the LTE system are the same, a single filter may be used, such that the number of filter coefficients to be stored is reduced, thereby increasing the efficiency of the hardware implementation.

In addition, the use of the CIC compensation filter 120 is fluid according to the corresponding system. For example, in the case of the LTE system of which carrier spacing is about 15 kHz, the influence of distortions due to the CIC decimation filter is large and thus, the CIC compensation filter 120 is required. On the other hand, in the case of a DVB-H system of which carrier spacing is not 5 kHz, the influence of distortions due to the CIC decimation filter 110 is not large and thus, a separate CIC compensation filter 120 may not be required. In this case, a function of preventing the aliasing from occurring when the down sampling is performed in the resampler 130 through a simple low pass filter (LPF) instead of the CIC decimation filter 110 may be added.

The resampler 130 block is a block that generates an output signal having a resampling rate set using the sampled input signal. The basic decimation filter performs an integer decimation function, while the resampler block performs a real decimation function. As a result, the resampler needs a function of estimating the output signal from the given input signal. The resampler used in the exemplary embodiment of the present invention uses a Farrow filter to which Lagrange interpolator polynomial is applied, thereby effectively estimating the output signal with a small number of taps.

Equation 2 is an equation that represents the Lagrange interpolator polynomial and the resampling. In Equation 2, t does not mean continuous time t, but is a value representing a position to be resampled as a relative position within 1 symbol interval.

$$y(t) = \sum_{i=I_1}^{I_2} C_i x(I_1 + I_2 - i) \text{ where}$$

$$C_i = \prod_{j=I_1, j \neq i}^{I_2} \frac{t - t_j}{t_i - t_j}$$

[Equation 2]

When using the resampler 130 using the Farrow filter, any input signal may be output by generating the desired sampling rates. Even when the input sampling rate is fluid, the constant output sampling rate is generated through the resampler 130, which may be effectively used in the system supporting the multiple bands.

Figure 5:
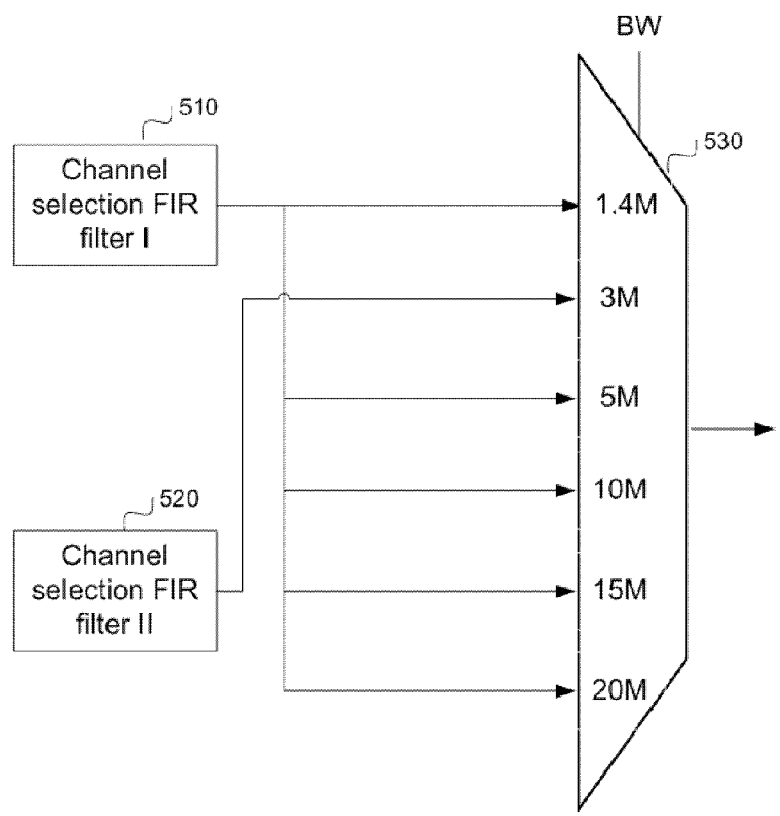
FIG. 5 is a diagram for explaining a structure of a channel compensation filter according to the exemplary embodiment of the present invention.

FIG. 5 is a diagram for explaining an operation of the channel selection filter 140 according to the exemplary embodiment of the present invention.

The channel selection filter 140, which is a filter performing very sudden filtering at an edge of a channel frequency band, serves to remove signal out-of-band noise. The channel selection filter 140 according to the exemplary embodiment of the present invention may be efficiently implemented in hardware without increasing the multiplier since the ratios of the sampling rates to the channel bands of all the signals are the same and the same number of taps is used regardless of the bands or the channel bands, due to the operation of the CIC decimation filter 110 and the resampler 130 of the front end. Channel selection filters 510 and 520 described in FIG. 5 store the coefficients of the channel selection filter according to each of the frequency bands. However, the channel selection filters 510 and 520 may also be implemented with one filter coefficient when the ratios of the sampling rates to the frequency bands are the same. In the case of the LTE system, the remaining five bands other than a band of 3 MHz may be implemented with one filter coefficient.

Table 3 shows the output sampling rate in each block according to the digital front end operation in the exemplary embodiment of the present invention.

Table 3 shows an example when the LTE system supporting six bands has the ADC output sampling rate of 275 MHz. As can be appreciated in Table 3, the CIC decimation filter 110 is configured by multi-stage, such that the resampling rates applied according to each band are approximately the same and the ratios of the sampling rates required in a baseband modem to the sampling rates of the output from the channel selection filter 140 are the same, such that the same channel selection filter 140 may be used.

Figure 6:
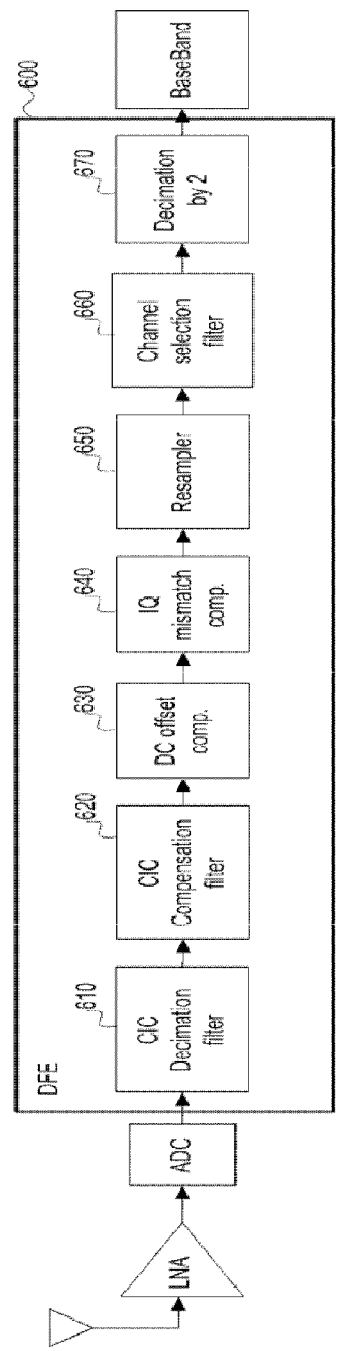
FIG. 6 is a diagram showing a schematic structure of the digital front end including a DC offset compensation block and an IQ mismatch compensation block according to the exemplary embodiment of the present invention.

FIG. 6 is a diagram for explaining a digital front end 600 including a DC offset compensation block 630 and an IQ mismatch compensation filter 640. In the exemplary embodiment of the present invention, since the digital front end 600 may output the desired sampling rate through the resampler 130 block and thus, be operated even in a Zero IF structure that does not permit IF. In the Zero IF structure, a separate mixer is not required. However, the DC offset or the IQ mismatch may occur in a structure without the mixer and as a result, the separate DC offset compensation block 630 and IQ mismatch compensation block 640 may be required.

The DC offset compensation block 630 serves to estimate and remove the DC offset that may be present in the received signal due to the receiver and noise.

$$\text{estimated } DC \text{ offset} = \frac{1}{N} \sum_{k=s}^{s+(N-1)} r(k)$$

[Equation 3]

Equation 3, which represents the estimation of DC offset of the received signal in the DC offset compensation block 630 used in the exemplary embodiment of the present invention, uses an average process of the received signal during the set number of samples.

The signal passing through the DC offset compensation block 630 passes through the IQ mismatch compensation block 640. Characteristics of I channel and Q channel of the digital RF receiver may be different in the structure that does not use the mixer. This phenomenon distorts an I channel signal and an Q channel signal, in particular, deteriorates an image rejection rate. In the exemplary embodiment of the present invention, a method for estimating and compensating the I/Q mismatch degree based on a condition in which the I channel and Q channel received signals need to be satisfied is used.

Equation 4 represents a condition in which a signal needs to be satisfied when there is no gain mismatch between the I channel and the Q channel. Based on the condition, the gain mismatch between the I channel and the Q channel may be estimated through Equation 5.

TABLE 3

| Band (MHz) | ADC Output Sampling Rate (MHz) | CIC Decimation | CIC Decimation Output Sampling Rate(MHz) | Resampling | Resampler Output Sampling Rate (MHz) | Channel Selection Filter Output Sampling Rate(MHz) |
|---|---|---|---|---|---|---|
| 20 | 275 | 2 | 137.5 | 2.2380 | 30.72*2 | 30.72*2 |
| 15 | 275 | 2 | 137.5 | 2.9839 | 23.04*2 | 23.04*2 |
| 10 | 275 | 4 | 68.75 | 2.2380 | 15.36*2 | 15.36*2 |
| 5 | 275 | 8 | 34.375 | 2.2380 | 7.68*2 | 7.68*2 |
| 3 | 275 | 16 | 17.1875 | 2.2380 | 3.84*2 | 3.84*2 |
| 1.4 | 275 | 32 | 8.5938 | 2.2380 | 1.92*2 | 1.92*2 |

$$E\{x_I^2\} = E\{x_Q^2\} \qquad \text{[Equation 4]}$$

$$\text{Estimated gain mismatch} = \frac{\sqrt{E\{x_Q^2\}} - \sqrt{E\{x_I^2\}}}{\sqrt{E\{x_Q^2\}} + \sqrt{E\{x_I^2\}}} \qquad \text{[Equation 5]}$$

Meanwhile, Equations 6 and 7 represent a condition in which the signal needs to be satisfied when there is no phase mismatch between the I channel and the Q channel and equations of estimating the phase mismatch between the I channel and the Q channel based on the condition.

$$E\{x_I x_Q\} = 0 \qquad \text{[Equation 6]}$$

$$\text{Estimated phase mismatch} = -\sin^{-1}\left(\frac{2E\{x_I x_Q\}}{E\{x_I^2\} + E\{x_Q^2\}}\right) \qquad \text{[Equation 7]}$$

Hereinafter, a method for receiving analog signals according to the exemplary embodiment of the present invention will be described.

In this case, the analog signals may be a radio high frequency communication signal. The method may be performed in the receiver including the above-mentioned digital front end.

The method is a method for receiving analog signals in the receiver supporting a first channel band and a second channel band. Accordingly, the receiver may additionally support a third channel band in some cases. The first channel band and the second channel band may each include bands shown in Tables 1 to 3.

The receiving method may include sampling analog signals received through an antenna, generating decimated signals by passing the sampled signal to the CIC decimation filter 110, and inputting the decimated signals to the channel selection filter 140. In this case, another digital processing block may be further included between the CIC decimation filter 110 and the channel selection filter 140, if necessary. The digital processing block may include the CIC compensation filter 120, the resampler 130, or the like, as described above. Herein, the sampling may be performed by the ADC.

In this case, a first ratio of the first channel band to the first sampling rate included in the signal output by passing a first signal having the first channel band among the analog signals to the CIC decimation filter 110 may be equal to a second ratio of the second channel band to the second sampling rate included in the signal output by passing the second signal having the second channel band among the analog signals to the CIC decimation filter 110. For example, the first channel band, the first sampling rate, the second channel band, and the second sampling rate may each be a band having 20 MHz, 137.5 MHz, a band having 10 MHz, and 68.75 MHz that are shown in Table 3. In this case, both of the first ratio and the second ratio may be 6.875.

In this case, the sampling rate at the sampling may be constant regardless of the channel bands of the analog signals. That is, the sampling rate of the ADC may be, for example, 275 MHz at all times.

In this case, the inputting to the channel selection filter 140 may include resampling the decimated signals. The resampling may be performed by the resampler 140.

The resampler 140 serves to make the resampling rate output regardless of the channel bands constant.

Hereinafter, an analog signal receiver according to another exemplary embodiment of the present invention will be described. The analog signal receiver, which is a receiver having the above-mentioned digital front end, may receive and process the analog signal inputted to the antenna.

The analog signal receiver may support at least the first channel band and the second channel band. Accordingly, the analog signal receiver may additionally support the third channel band in some cases. The first channel band and the second channel band may each include the bands shown in Tables 1 to 3.

The analog signal receiver may include the analog-to digital converter (ADC) that samples the analog signals received from the antenna with the digital signals, the CIC decimation filter 110 that decimates the output signals from the ADC, and the channel selection filter 140 that receives the signals output from the CIC decimation filter 110, wherein the CIC decimation filter 110 may have a configuration in which a plurality of the same CIC filters 210, 220, 230, and 240 are connected in series In this case, another digital processing block may be further included between the CIC decimation filter 110 and the channel selection filter 140, if necessary.

In this case, a first ratio of the first channel band to the first sampling rate included in the signal output by passing a first signal having the first channel band among the analog signals to the CIC decimation filter 110 may be equal to a second ratio of the second channel band to the second sampling rate included in the signal output by passing the second signal having the second channel band among the analog signals to the CIC decimation filter 110. For example, the first channel band, the first sampling rate, the second channel band, and the second sampling rate may each be a band having 20 MHz, 137.5 MHz, a band having 10 MHz, and 68.75 MHz that are shown in Table 3. In this case, both of the first ratio and the second ratio may be 6.875.

In this case, the sampling rate of the ADC may be constant regardless of the channel bands of the analog signals. That is, the sampling rate of the ADC may be, for example, 275 MHz at all times. Further, the first resampling rate to the first signal having the first channel band among the analog signals may be equal to the second resampling rate to the second signal having the second channel band among the analog signals.

In this case, the analog signal receiver may further include the resampler 130 between the CIC decimation filter 110 and the channel selection filter 140.

In this case, the CIC compensation filter 120 may be further included between the CIC decimation filter 110 and the resampler 130 and the frequency response of the CIC compensation filter 120 at the first channel band and the second channel band may have the inverse relationship with the frequency response of the CIC decimation filter 110 at the first channel band and the second channel band.

Each component of the exemplary embodiment of the present invention may be implemented by a programmable logic gate array (FPGA) or a dedicated semiconductor device such as ASIC. Further, each component may separately be implemented in different semiconductor chips, but several components of the exemplary embodiment of the present invention may be implemented on a single semiconductor chip.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A method for receiving a signal through a receiver that includes a digital front end supporting multiple channel bands, the method comprising:
   sampling analog signals received through an antenna of the receiver supporting at least a first channel band and a second channel band;
   generating decimated signals by passing the sampled signals to a cascaded integrator comb (CIC) decimation filter; and
   inputting the decimated signals to a channel selection filter,
   wherein a first ratio of a bandwidth of the first channel band to a first sampling rate included in a first decimated signal output by passing a first signal having the first channel band among the analog signals to the CIC decimation filter is equal to a second ratio of a bandwidth of the second channel band to a second sampling rate included in a second decimated signal output by passing a second signal having the second channel band among the analog signals to the CIC decimation filter.

2. The method of claim 1, wherein a sampling rate at the sampling is constant regardless of channel bands of the analog signals.

3. The method of claim 1, wherein the inputting includes resampling the decimated signals.

4. The method of claim 3, wherein a sampling rate at the resampling is constant regardless of the first channel band and the second channel band.

5. A receiver including a digital front end supporting multiple bands, the receiver comprising:
   an analog-to-digital converter (ADC) configured to sample analog signals received through an antenna and generate digital signals;
   a CIC decimation filter configured to decimate the digital signals from the ADC; and
   a channel selection filter configured to receive decimated signals output from the CIC decimation filter,
   wherein the CIC decimation filter includes a plurality of CIC filters connected in series and supports at least a first channel band and a second channel band, and
   wherein a first ratio of a bandwidth of the first channel band to a first sampling rate included in a first decimated signal output by passing a first signal having the first channel band among the analog signals to the CIC decimation filter is equal to a second ratio of a bandwidth of the second channel band to a second sampling rate included in a second decimated signal output by passing a second signal having the second channel band among the analog signals to the CIC decimation filter.

6. The receiver of claim 5, wherein a sampling rate of the ADC is constant regardless of the channel bands of the analog signals.

7. The receiver of claim 5, further comprising a resampler configured to resample the decimated signals and disposed between the CIC decimation filter and the channel selection filter, wherein a sampling rate of the resampler is constant regardless of the first channel band and the second channel band.

8. The receiver of claim 7, further comprising a CIC compensation filter disposed between the CIC decimation filter and the resampler, wherein a frequency response of the CIC compensation filter at the first channel band and the second channel band has an inverse relationship with a frequency response of the CIC decimation filter at the first channel band and the second channel band.

9. The receiver of claim 8, further comprising:
   a direct current (DC) offset compensation filter configured to estimate and remove a DC offset present in an output signal of the CIC compensation filter; and
   an IQ mismatch compensation filter configured to estimate and compensate an I/Q mismatch degree of an output signal of the DC offset compensation filter,
   wherein the DC offset compensation unit and the I/Q mismatch compensation filter are disposed between the CIC compensation filter and the resampler.

* * * * *